United States Patent
Vaughn

(10) Patent No.: US 7,647,816 B2
(45) Date of Patent: Jan. 19, 2010

(54) SINGLE CAR TEST INTERFACE DEVICE

(75) Inventor: Lawrence E Vaughn, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 282 days.

(21) Appl. No.: 11/746,327

(22) Filed: May 9, 2007

(65) Prior Publication Data

US 2008/0276691 A1    Nov. 13, 2008

(51) Int. Cl.
    G01M 3/02        (2006.01)
(52) U.S. Cl. ......................................................... 73/39
(58) Field of Classification Search ................ 73/39; 303/9.66
    See application file for complete search history.

(56) References Cited

U.S. PATENT DOCUMENTS

| | | | |
|---|---|---|---|
| 2,993,199 A | 7/1961 | Browne et al. | |
| 5,509,727 A | 4/1996 | Hart et al. | |
| 5,695,258 A | 12/1997 | Reid et al. | |
| 5,808,909 A | 9/1998 | Rees | |
| 5,967,620 A * | 10/1999 | Truglio et al. | 303/3 |
| 6,094,977 A | 8/2000 | Vaughn | |
| 6,206,483 B1 | 3/2001 | LaLone | |
| 6,318,811 B1 * | 11/2001 | Root et al. | 303/7 |
| 6,327,894 B2 | 12/2001 | Vaughn | |
| 6,334,354 B2 | 1/2002 | Vaughn et al. | |
| 6,425,282 B2 | 7/2002 | Vaughn | |
| 6,883,874 B2 | 4/2005 | McCurdy, Jr. et al. | |

* cited by examiner

Primary Examiner—Hezron Williams
Assistant Examiner—Nathaniel Kolb

(57) ABSTRACT

A single car test device includes a housing; a source port, on the housing, to be connected to a source of pressurized air; a brake pipe port, on the housing, to be connected to the brake pipe connector; and valves, in the housing, selectively interconnecting the ports to each other and atmosphere to perform tests. A brake cylinder sensor is to be connected to a brake cylinder tap. A sensor module on an interface device, remote from the housing, is to be mounted on the test ports on a control valve for determining pressure at the test ports. A controller is connected to the valves, the sensor module and the brake cylinder sensor and includes a program performing a plurality of component tests which form a single car test. The interface device includes reservoir charging valves controlled by the controller.

5 Claims, 2 Drawing Sheets

SINGLE CAR TEST INTERFACE DEVICE

BACKGROUND AND SUMMARY OF THE DISCLOSURE

The present disclosure relates generally to rail car test devices and more specifically to a portable computerized single car test device (CSCTD).

The American Association of Railroads (AAR) has established standard S-486 for testing railroad car brake systems for a single stand alone car. Historically, the single car test device with a pressure source and meter and hand control is connected to the glad hand at one end of the car.

More recently computerized single car test devices have been developed. U.S. Pat. Nos. 5,509,727 and 5,808,909 are examples of CSCTD in the use which are connected to a 4-Port Test Adapter on the pipe bracket of a brake control valve by four pressure lines and perform the test using the four ports. The source of pressure is into the CSCTD and used to charge the brake pipe and the reservoirs. The four test ports are brake pipe, brake cylinder, auxiliary reservoir and emergency reservoir. These CSCTD, which conduct the Single Car Test through the adapter, require an external volume to simulate the Brake Pipe volume of the car under test.

U.S. Pat. No. 6,334,354 is an example of a CSCTD available from New York Air Brake Corporation wherein the source of pressure is provided by the CSCTD to the brake pipe at the glad hand and pressure measurements are made at the brake pipe and the brake cylinder using only two pressure lines. The CSCTD also controls the brake pipe to charge the reservoirs. This CSCTD conducts the Single Car Test from the end of the car, which allows the brake system to be tested as a whole without an external volume.

The present computerized single car test device is designed to incorporate the best practices of the previous CSCTDs. The single car test device is for a rail car brake system having a brake pipe with a connector, a brake cylinder, brake cylinder tap, a reservoir, a control valve connected to the brake pipe, the brake cylinder and the reservoir, and brake pipe and reservoir test ports on the control valve. The test device includes a housing; a source port, on the housing, to be connected to a source of pressurized air; a brake pipe port, on the housing, to be connected to the brake pipe connector; and valves, in the housing, selectively interconnecting the ports to each other and atmosphere to perform tests. A brake cylinder sensor is to be connected to the brake cylinder tap. A sensor module, remote from the housing, is to be mounted on the test ports on the control valve for determining pressure at the test ports. A controller is connected to the valves, the sensor module and the brake cylinder sensor and includes a program performing a plurality of component tests which form a single car test.

If the brake cylinder tap is a brake cylinder test port on the control valve; the brake cylinder sensor is in the sensor module and determines pressure at the brake cylinder test port. If the brake cylinder sensor is in the housing, the housing has a brake cylinder port to be connected to the brake cylinder tap. The brake cylinder sensor may be mounted to the brake cylinder tap and connected to the controller by one of wire and wirelessly. The brake cylinder tap may be on the brake cylinder or an empty load device.

If the brake system includes an auxiliary reservoir and an emergency reservoir and auxiliary and emergency reservoir test ports; the pressure module determines pressure at the auxiliary reservoir test port and the emergency reservoir test port. The sensor module may include an electropneumatic valve connected between the brake pipe and the reservoir ports when the sensor module is mounted to the test ports and connected to the controller to charge the reservoir from the brake pipe.

A single car test interface device, for a rail car brake system having brake cylinder, brake pipe, and reservoir test ports, includes a housing having brake cylinder, brake pipe and reservoir sensor ports to be mounted respectively to the brake cylinder, brake pipe, a reservoir and emergency reservoir test ports. Pressure sensors are connected to the sensor ports. An electropneumatic valve is connected between the brake pipe and the reservoir sensor port. A first outlet is connected to the pressure sensor for receiving a connector of a single car test device; and a second outlet is connected to the valves for receiving a connector of a single car test device.

The test ports may be on a control valve of the brake system. The first and second outlets may be a common outlet for receiving a single connector of the single car test device. If the brake system includes an auxiliary reservoir test port and an emergency reservoir test port, the housing includes an auxiliary reservoir sensor port and an emergency reservoir sensor port. Also, a pair of electropneumatic valves are each connected between the brake pipe and a respective reservoir sensor ports.

Other objects, advantages and novel features of the present invention will become apparent from the following detailed description when considered in conjunction with the accompanying drawings.

DETAILED DESCRIPTION OF THE DRAWINGS

The portable computerized single car test device currently using the 4-Port Test Adapter requires individual air lines, which connect to the Brake Pipe, Auxiliary Reservoir, Emergency Reservoir and Brake Cylinder. These air lines are used to provide quick charge of the two compartment reservoir and to monitor system pressures, which are used to perform diagnostics of test failures. The present CSCTD does not require individual air lines or the pneumatic hardware that would be required to operate such a system. This present CSCTD mounts any required hardware in an Interface device which is controlled by a signal from the computer within the CSCTD. This makes the Interface lighter, and more reliable as there are fewer air connections and moving parts.

The interface device mounts pressure transducers in the form of NYAB's 777540 Pressure Sensing Module on an interface plate that mates with the 4-Port Test Adapter. The interface plate will provide the proper ports and passages from the Brake Pipe, Brake Cylinder and Reservoirs to the Pressure Sensing Module. This Pressure Sensing Module would interface with the CSCTD electronically, which will simplify the changes to the current hardware and software. The Pressure Sensing Module will monitor Brake Pipe, Auxiliary Reservoir, Emergency Reservoir and Brake Cylinder pressures. By monitoring the system pressures, detailed diagnosis of brake system failures can be performed. For detailed explanation of the Pressure Sensing Module reference is made to U.S. Pat. No. 6,883,874, which is incorporated herein by reference.

The present Interface device also includes two solenoid valves. One will be connected between Brake Pipe and Auxiliary Reservoir and the other will be connected between Brake Pipe and Emergency Reservoir. These solenoid valves will be turned on and off electronically by the CSCTD and will use Brake Pipe Pressure to quick charge the two system reservoirs. Quick charging the reservoirs during the Single Car Test can substantially reduce overall test time.

Figure 1:
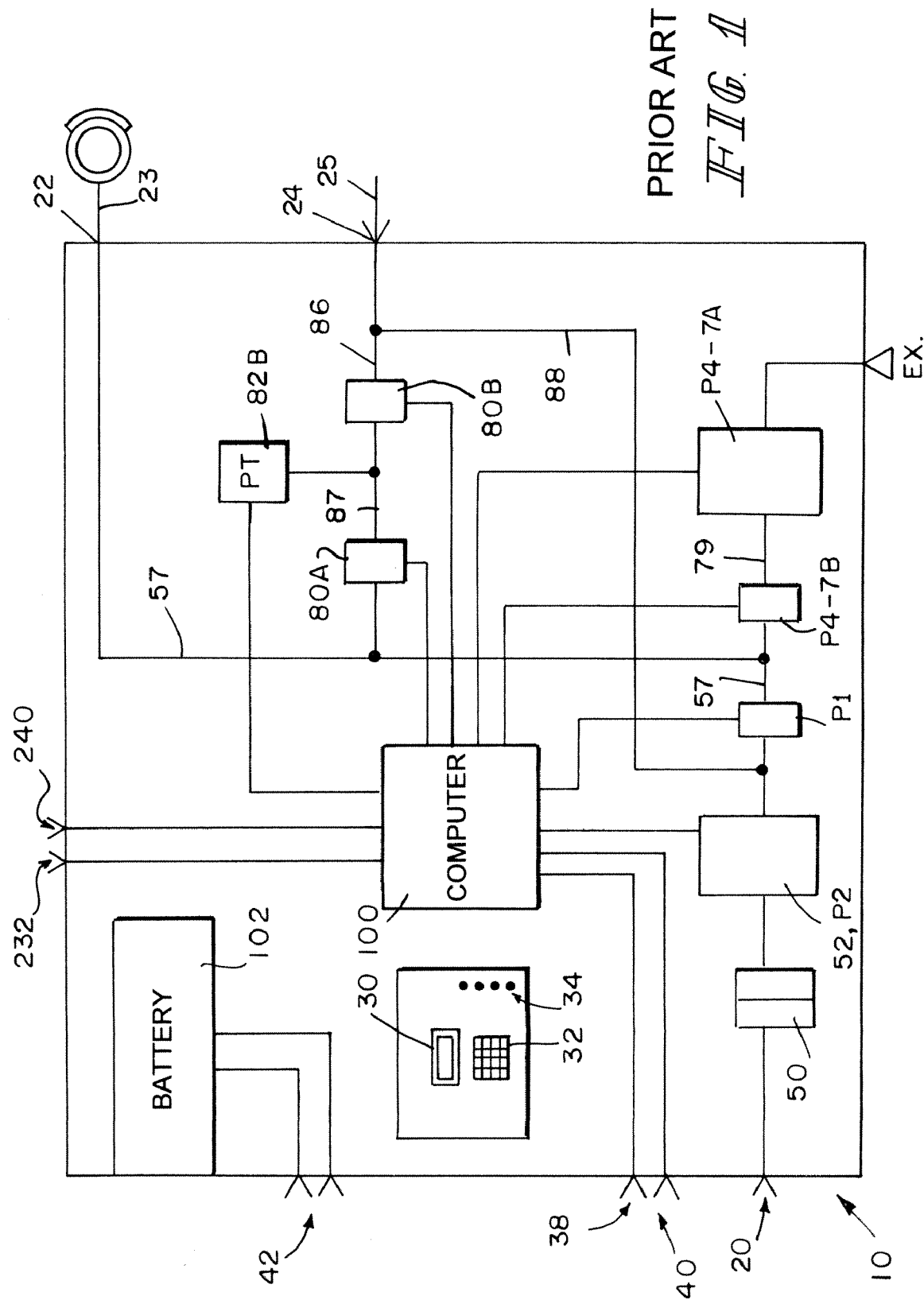
FIG. 1 is a schematic view of portable computerized single car test device according to the prior art.

An example of the computerized single car test device 10 of the prior art is illustrated in FIG. 1. The detailed explanation of this device is described in U.S. Pat. No. 6,334,354 which is incorporated herein by reference. The same numbers will be used for easy reference. It is this CSCTD that is being used in FIG. 2. The CSCTD 10 includes a source port 20, a brake pipe port 22 and a brake cylinder 24. The source port 20 is connected to a source of pressurized air, for example, a compressor. The brake pipe port 22 is connected through hose 23 to a glad hand to be connected to a glad hand to the train brake pipe TBP illustrated in FIG. 2. The brake cylinder port 24 is connected by hose 25 to a tap brake cylinder BC illustrated in FIG. 2.

A display 30 with a keyboard 32 is provided. Additional operator inputs or buttons 34 are provided. A microprocessor computer 100 is provided which has the software to perform the single car test as well as to store data and perform analysis. Computer port 38 and a printer port 40 on the housing connected to computer 100. Power port 42 is connected for charging batteries 102.

The source port 20 is connected through filters 50 (not shown) to computer controlled valve 52/P2. Whose output is provided by line 88 to the brake cylinder port 24. It is also provided through computer controlled valve P1 through line 57 to the brake pipe port 22. Discharge valve P4-7B connects the brake pipeline 57 and brake pipe port 23 to exhaust through a pressure regulator P4-7A which is also computer controlled. Pressure transducer 82B is selectively connected to the brake pipe port 23 via computer controlled valve 80A and to the brake cylinder port 24 by valve 80B via line 87.

The CSCTD of FIG. 1 is only one example of a prior art single car test device that can be used with the interface device of the present disclosure. It is the type of CSCTD which connects the source to the brake pipe through the glad hand and not through the test ports on the control valve. Also it is important that there is separate access to the brake cylinder other than the brake control valve such that measurements can be made downstream on any empty load device which is between the brake control valve and the brake cylinder.

Figure 2:
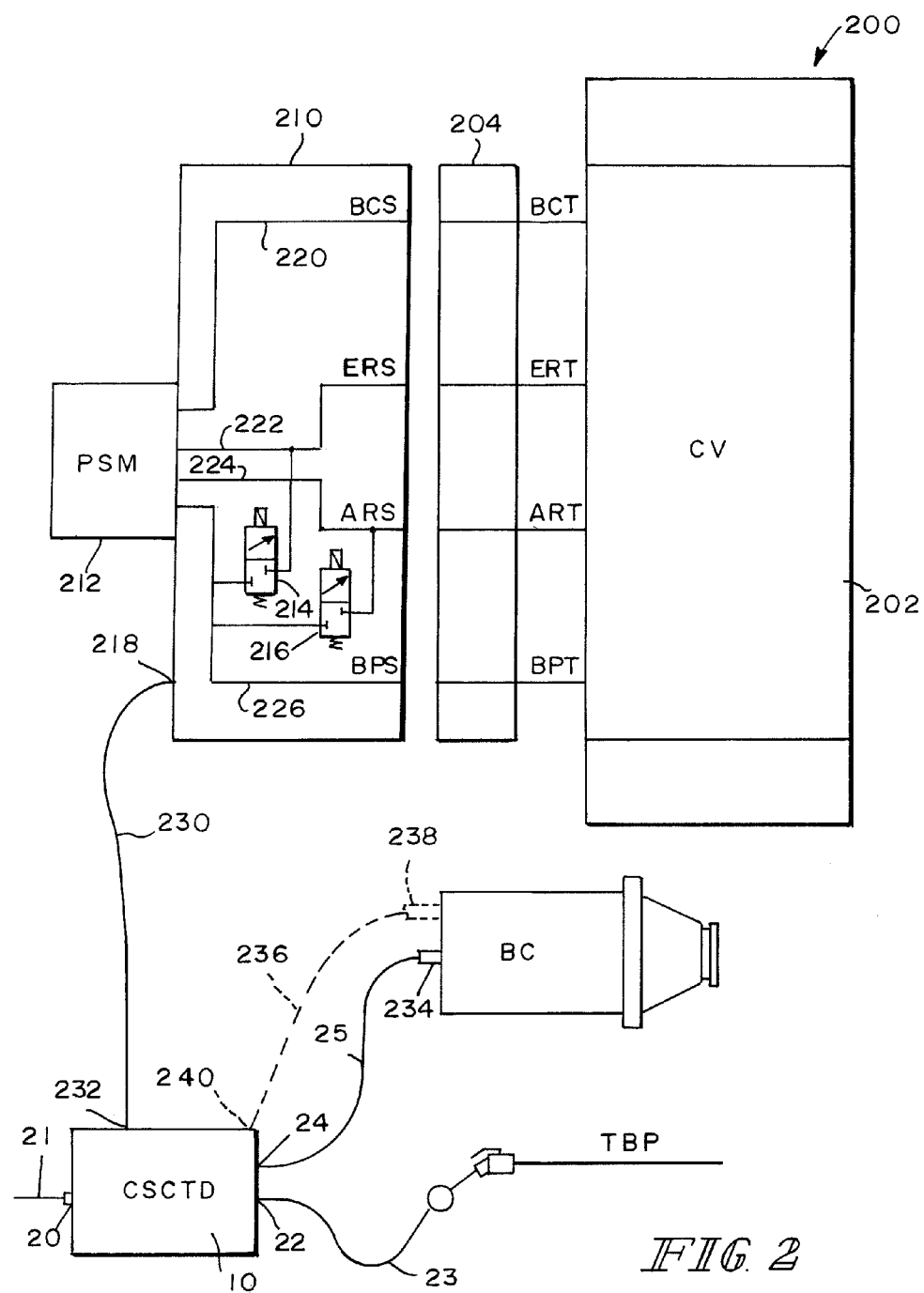
FIG. 2 is a schematic view of portable computerized single car test device and interface device according to the present design

An overview of a computerized single car test device in use is illustrated in FIG. 2. The car includes a train brake pipe TBP, a brake cylinder BC and a brake control valve CV 200. The brake control valve 200 includes a pipe bracket 202. A four-port test adaptor 204 has brake cylinder test port BCT emergency reservoir test port ERT, auxiliary reservoir test port ART and brake pipe test port BPT mounted to the pipe bracket 202.

An interface device 210 includes brake cylinder sensor port BSC and emergency reservoir sensor port ERS, auxiliary reservoir sensor port ARS and brake pipe sensor port BPS to be mounted and connected to the respective ports of the four-port test adaptor 204. A pressure sensor module PSM 212 is provided on the interface device 210. As previously indicated, this is a module described in detail in U.S. Pat. No. 6,883,874. It provides four sensors connected to the brake cylinder port, the emergency reservoir sensor port, the auxiliary reservoir sensor port and the brake pipe sensor port by passages 220, 222, 224 and 226, respectfully.

The interface device 210 also includes two electropneumatic valves 214 and 216 which selectively connect the brake pipe passage 226 to the emergency reservoir passage 222 and the auxiliary reservoir 224, respectfully. These electropneumatic valves 214,216 are controlled by the CSCTD to quickly charge the emergency and auxiliary reservoirs from the brake pipe. An electrical outlet 218 on the interface device 210 provides the electrical connection between the pressure sensor module 212 and electropneumatic valves 214,216 with CSCTD via electric line 230 connected to connector 232 of the CSCTD 10. Although a single outlet is preferred, separate outlets may be provided for the pressure sensor module 212 and the controls connection to the electropneumatic 214,216.

As previously discussed, providing a connection of monitoring the pressure at the brake cylinder BC directly to the CSCTD 10 is desirable since in many systems an empty-load device will be between the brake control valve 200 and the brake cylinder BC. A pneumatic connection or hose 25 may be connected to a tap 234 on the brake cylinder. Alternatively, a pressure sensor 238 shown in phantom may be provided at the port 234 and connected via media 236 to a port 240 on the CSCTD 10. Media 236 may be an electric line or may be wireless. Thus the port 240 would be a receiver if the sensor 238 was a wireless. Although the brake cylinder tap 234 is illustrated on the brake cylinder, it may also be on the output side of the empty-load device as shown in U.S. Pat. No. 6,206,483.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed:

1. A single car test interface device for a rail car brake system having a brake cylinder, a brake pipe, and reservoir test ports, the device comprising:
    a housing having brake cylinder, brake pipe and reservoir sensor ports to be mounted respectively to the brake cylinder, the brake pipe, a reservoir and emergency reservoir test ports;
    pressure sensors connected to the sensor ports;
    an electropneumatic valve connected between the brake pipe and the reservoir sensor ports;
    a first outlet connected to the pressure sensor for receiving a connector of the single car test device; and
    a second outlet connected to the valve for receiving a connector of the single car test device.

2. The device according to claim 1, wherein the test ports are on a control valve of the brake system.

3. The device according to claim 1, wherein the first and second outlets are a common outlet for receiving a single connector of the single car test device.

4. The device according to claim 1, wherein the brake system includes an auxiliary reservoir test port and an emergency reservoir test port and the housing includes an auxiliary reservoir sensor port and an emergency reservoir sensor port.

5. The device according to claim 4, further including a pair of electropneumatic valves each connected between the brake pipe and a respective reservoir sensor port.

* * * * *